US012500658B2

(12) United States Patent
Strater et al.

(10) Patent No.: US 12,500,658 B2
(45) Date of Patent: Dec. 16, 2025

(54) COUNTRY CODE OR TRANSMISSION POWER CONFIGURATION PRIOR TO ONBOARDING AN EXTENDER

(71) Applicant: ARRIS Enterprises LLC, Suwanee, GA (US)

(72) Inventors: Jay W. Strater, San Diego, CA (US); Kurt A. Lumbatis, Dacula, GA (US); Gregory Nobutaka Nakanishi, San Diego, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 406 days.

(21) Appl. No.: 18/093,474

(22) Filed: Jan. 5, 2023

(65) Prior Publication Data

US 2023/0224019 A1    Jul. 13, 2023

Related U.S. Application Data

(60) Provisional application No. 63/298,725, filed on Jan. 12, 2022.

(51) Int. Cl.
*H04B 7/155* (2006.01)
*H04W 52/34* (2009.01)

(52) U.S. Cl.
CPC ........ *H04B 7/15507* (2013.01); *H04W 52/34* (2013.01)

(58) Field of Classification Search
CPC .............. H04B 7/15507; H04W 52/34; H04W 52/367; H04W 24/02; H04W 52/28;
(Continued)

(56) References Cited

U.S. PATENT DOCUMENTS 7,650,428 B1   1/2010   Taaghol et al.
2007/0237121 A1* 10/2007  Khandelwal .......... H04W 24/00
                                                370/338

(Continued)

FOREIGN PATENT DOCUMENTS

EP           1 950 987           7/2008

OTHER PUBLICATIONS

International Search Report and Written Opinion of the International Searching Authority issued Apr. 24, 2023 in International (PCT) Application No. PCT/US2023/010186.
(Continued)

*Primary Examiner* — Mohamed A Kamara
(74) *Attorney, Agent, or Firm* — Wenderoth, Lind & Ponack, L.L.P.

(57) ABSTRACT

A wireless network extender device is for use with a wireless access point device which is connected to a wireless network. The wireless network extender device is configured to transmit an onboarding communication on a current operating channel. The wireless network extender device includes: a radio; a memory having instructions and country code data; and a processor configured to execute the instructions stored on the memory to cause the wireless network extender device to: receive the onboarding communication on the current operating channel; identify a determined maximum broadcasting power based on the onboarding communication and the country code data; and initiate an onboarding process with the wireless access point device at the determined maximum broadcasting power on the current operating channel.

3 Claims, 9 Drawing Sheets

(58) Field of Classification Search
CPC ..... H04W 52/46; H04W 84/12; H04W 48/08; H04W 48/16; H04W 48/18
See application file for complete search history.

(56) References Cited

U.S. PATENT DOCUMENTS

2014/0323108 A1* 10/2014 Doubek .............. H04W 52/367
 455/418
2016/0014824 A1 1/2016 Xiang et al.
2016/0095103 A1* 3/2016 Bhattacharyya ...... H04W 48/12
 455/452.1

OTHER PUBLICATIONS

International Preliminary Report on Patentability dated Jun. 20, 2024 in International (PCT) Application No. PCT/US2023/010186.

* cited by examiner

PRIOR ART

| Country Code | Country/Region | 2.4 GHz | | 5 GHz UNII-1 | 5 GHz UNII-2 | 5 GHz UNII-2 EXT | 5 GHz UNII-2 EXT | 5 GHz UNII-2 EXT | UNII-3 EXT |
|---|---|---|---|---|---|---|---|---|---|
| | | Ch 1-11 | Ch 12-13 | Ch 36-48 | Ch 52-64 | Ch 100-116 | Ch 120-140 | Ch 144 | Ch 149-165 |
| XA | Extended Americas | 100 mW EIRP | | 50 mW | 250 mW | 250 mW | 250 mW | 500 mW | 500 mW |
| ○○○ | ○○○ | ○○○ | 214 | ○○○ | ○○○ | ○○○ | ○○○ | ○○○ | ○○○ |
| ○○○ | ○○○ | ○○○ | | ○○○ | ○○○ | ○○○ | ○○○ | ○○○ | ○○○ |
| ○○○ | ○○○ | ○○○ | | ○○○ | ○○○ | ○○○ | ○○○ | ○○○ | ○○○ |
| CA | Canada | 1000 mW | | 250 mW | 250 mW | 250 mW | 250 mW | 1000 mW | 1000 mW |

COUNTRY CODE OR TRANSMISSION POWER CONFIGURATION PRIOR TO ONBOARDING AN EXTENDER

BACKGROUND

Embodiments of the invention relate to onboarding an extender to a gateway device.

SUMMARY

Aspects of the present invention are drawn to a wireless network extender device for use with a wireless access point device being connected to a wireless network, and being configured to transmit an onboarding communication on a current operating channel, the wireless network extender device including: a radio configured to receive the onboarding communication on the current operating channel and initiate an onboarding process with the wireless access point device at one of a default maximum broadcasting power on the current operating channel or a determined maximum broadcasting power on the current operating channel; a memory having instructions and country code data stored therein; and a processor configured to execute the instructions stored on the memory to cause the wireless network extender device to: receive the onboarding communication on the current operating channel; identify the determined maximum broadcasting power based on the onboarding communication and the country code data; and initiate the onboarding process with the wireless access point device at the determined maximum broadcasting power on the current operating channel.

In some embodiments, the wireless network extender device for use with the wireless access point device being configured to transmit a country code within a beacon on the current operating channel, the onboarding communication including the beacon, wherein the country code data includes maximum broadcasting power data, and wherein the processor is configured to execute instructions stored on the memory to cause the wireless network extender device to further: retrieve the country code from the beacon; and identify the determined maximum broadcasting power on the current operating channel based on the country code, the country code data, and the maximum broadcasting power data.

In some embodiments, the wireless network extender device for use with the wireless access point device being configured to transmit, on the current operating channel, a maximum transmission power value for the current operating channel within a beacon, the onboarding communication including the beacon, wherein the processor is configured to execute instructions stored on the memory to cause the wireless network extender device to further: retrieve the maximum transmission power value from the beacon; and identify the determined maximum broadcasting power based on the maximum transmission power value.

In some embodiments, the wireless network extender device for use with the wireless access point device being configured to transmit, in a beacon on the current operating channel, an SSID name that contains country code information used for onboarding, the onboarding communication including the SSID name that contains country code information, wherein the country code data includes maximum broadcasting power data of the current operating channel, and wherein the processor is configured to execute instructions stored on the memory to cause the wireless network extender device to further: retrieve the country code from the SSID name that contains the country code information; and identify the determined maximum broadcasting power based on the country code information, the country code data, and the maximum broadcasting power data.

Other aspects of the present disclosure are drawn to a method of operating a wireless network extender device with a wireless access point device being connected to a wireless network, and being configured to transmit an onboarding communication on a current operating channel, the method including: receiving, via a radio configured to receive the onboarding communication and initiate an onboarding process with the wireless access point device at one of a default maximum broadcasting power on the current operating channel or a determined maximum broadcasting power on the current operating channel, the onboarding communication on the current operating channel; determining, via a processor configured to execute instructions stored on a memory having instructions and country code data stored therein, a determined maximum broadcasting power based on the onboarding communication and the country code data; and instructing, via the processor, the radio to initiate the onboarding process with the wireless access point device at the determined maximum broadcasting power on the current operating channel.

In some embodiments, the method for additional use with the wireless access point device being configured to transmit a country code within a beacon on the current operating channel, the onboarding communication including the beacon, wherein the country code data includes maximum broadcasting power data, the method further including: retrieving, via the processor, the country code from the beacon; and determining, via the processor, the determined maximum broadcasting power on the current operating channel based on the country code, the country code data, and the maximum broadcasting power data.

In some embodiments, the method for additional use with the wireless access point device being configured to transmit, on the current operating channel, a maximum transmission power value for the current operating channel within a beacon, the onboarding communication including the beacon, the method further including: retrieving, via the processor, the maximum transmission power value from the beacon; and determining, via the processor, the determined maximum broadcasting power based on the maximum transmission power value.

In some embodiments, the method for additional use with the wireless access point device being configured to transmit, in a beacon on the current operating channel, an SSID name that contains country code information used for onboarding, the onboarding communication including the SSID name that contains country code information, wherein the country code data includes maximum broadcasting power data of the current operating channel, the method further including: retrieving, via the processor, the country code from the SSID name that contains country code information; and determining, via the processor, the determined maximum broadcasting power based on the country code information, the country code data, and the maximum broadcasting power data.

Other aspects of the present disclosure are drawn to a non-transitory, computer-readable media having computer-readable instructions stored thereon, the computer-readable instructions being capable of being read by a wireless network extender device for use with a wireless access point device being connected to a wireless network, and being configured to transmit an onboarding communication on a current operating channel, wherein the computer-readable instructions are capable of instructing the wireless network extender device to perform the method including: receiving, via a radio configured to receive the onboarding communication and initiate an onboarding process with the wireless access point device at one of a default maximum broadcasting power on the current operating channel and a determined maximum broadcasting power on the current operating channel, the onboarding communication on the current operating channel; determining, via a processor configured to execute instructions stored on a memory having instructions and country code data stored therein, a determined maximum broadcasting power based on the onboarding communication and the country code data; and instructing, via the processor, the radio to initiate the onboarding process with the wireless access point device at the determined maximum broadcasting power on the current operating channel.

In some embodiments, the non-transitory, computer-readable media for additional use with the wireless access point device being configured to transmit a country code within a beacon on the current operating channel, the onboarding communication including the beacon, wherein the country code data includes maximum broadcasting power data, and wherein the computer-readable instructions are capable of instructing the wireless network extender device to perform the method further including: retrieving, via the processor, the country code from the beacon; and determining, via the processor, the determined maximum broadcasting power on the current operating channel based on the country code, the country code data, and the maximum broadcasting power data.

In some embodiments, The non-transitory, computer-readable media for additional use with the wireless access point device being configured to transmit, on the current operating channel, a maximum transmission power value for the current operating channel within a beacon, the onboarding communication including the beacon, wherein the computer-readable instructions are capable of instructing the wireless network extender device to perform the method further including: retrieving, via the processor, the maximum transmission power value from the beacon; and determining, via the processor, the determined maximum broadcasting power based on the maximum transmission power value.

In some embodiments, the non-transitory, computer-readable media for additional use with the wireless access point device being configured to transmit, in a beacon on the current operating channel, an SSID name that contains country code information used for onboarding, the onboarding communication including the SSID name that contains country code information, wherein the country code data includes maximum broadcasting power data of the current operating channel, and wherein the computer-readable instructions are capable of instructing the wireless network extender device to perform the method further including: retrieving, via the processor, the country code from the SSID name that contains country code information; and determining, via the processor, the determined maximum broadcasting power based on the country code information, the country code data, and the maximum broadcasting power data.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

The present disclosure generally deals with onboarding a new extender onto an existing wireless network. A prior art method of onboarding a new extender onto an existing wireless network will first be described to outline a problem the present disclosure is addressing. This will be described in greater detail with reference to FIGS. 1A-C.

Figure 1A:
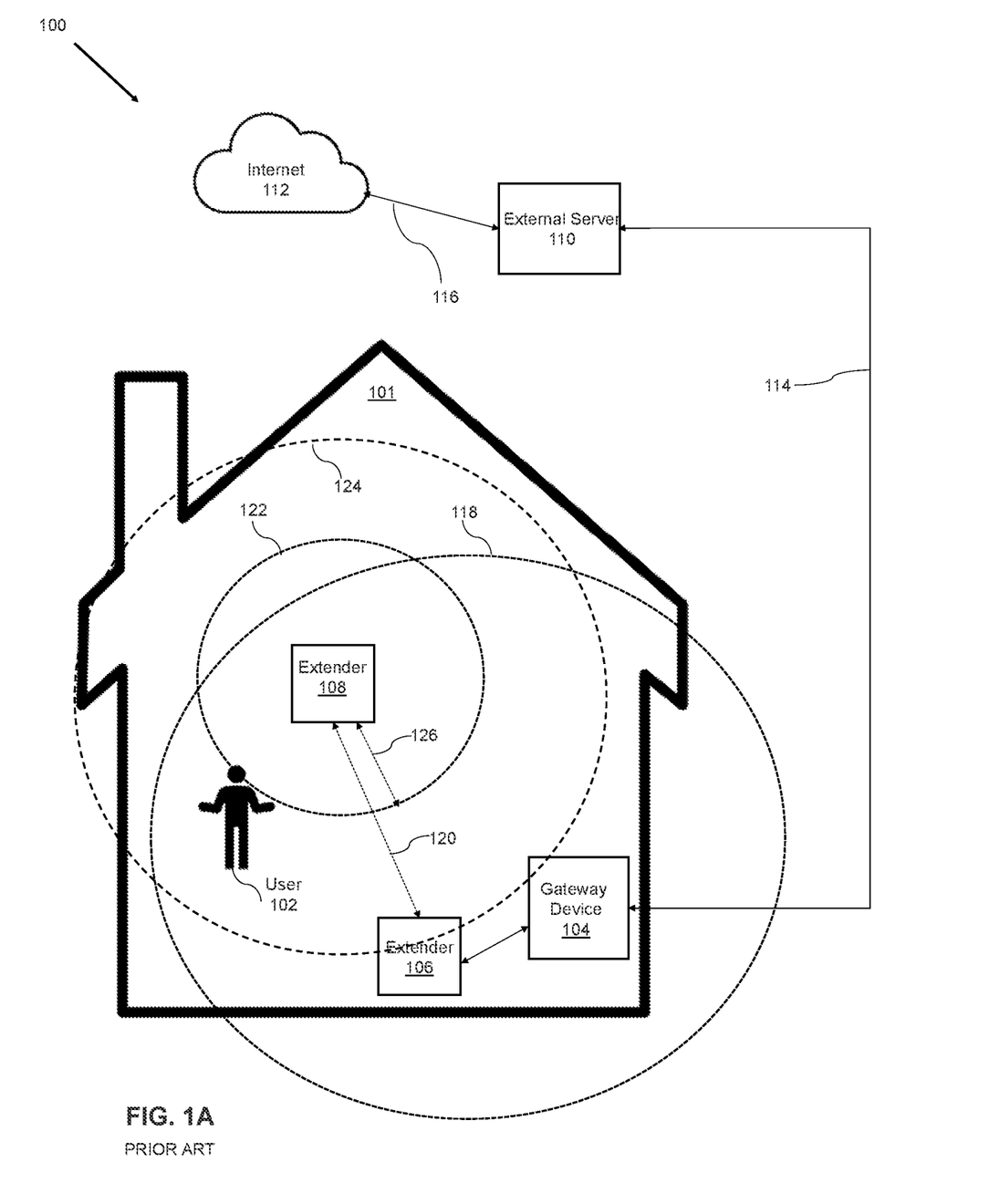
FIG. 1A illustrates a prior art communication system at a time $t_0$.

FIG. 1A illustrates a prior art communication system 100 at a time $t_0$.

As shown in FIG. 1A, communication system 100 includes a residence 101, a user 102, a gateway device 104, an extender 106, an extender 108, an external server 110, an Internet 112, and communication channels 114 and 116.

Gateway device 104 is an electronic device that has a wide area network (WAN) connection and supports a local area network (LAN) at a consumer premises. Gateway device 104 is a device that combines the functions of a modem and a router. A modem is a device that connects to your cable or phone lines and translates the data or information from the Internet to your computer or connected device. A router is a device that works with your modem to create and manage a wireless network so as to wirelessly take the data coming through the modem and sends it wirelessly to multiple devices like smart phones, tablets, gaming consoles, and computers. The consumer premises can include a residential dwelling, an office, or any other business space of a user, such as residence 101. The terms home, office, and premises may be used synonymously herein.

Gateway device 104 may perform such functions as Web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED) Egress queuing, TCP/UDP flow control), bandwidth usage policing, dynamic load balancing, and routing.

Further, it should be noted that gateway device 104 is able to communicate with external server 110 via communication channel 114, which may optionally be a wireless communication system, such as 4G, or 5G, and further is able to connect to Internet 112 via communication channel 116.

Gateway device 104 serves as a gateway or an access point to Internet 112 for one or more electronic devices.

A wireless access point (WAP), or more generally known as an access point (AP), is a networking hardware device that allows other Wi-Fi devices to connect to a Wi-Fi network. It resides in the gateway and wireless extender devices. A service set ID (SSID) is an identification (in IEEE 202.11) that is broadcast by access points in beacon packets to announce the presence of a wireless network access point for the SSID. SSIDs are customizable IDs that can be zero to 32 bytes, and can be in a natural language, such as English. In residence 101, gateway device 104, extender 106, and extender 108 are access points.

Consider the situation in which user 102 has recently purchased extender 108, and would like to onboard it to their home network. As shown in the figure, when extender 108 is powered up, extender 108 will detect a beacon 120 broadcast from extender 106. Beacon 120 alerts extender 108 to the wireless network of gateway device 104 and extender 106. In this example, extender 106 is broadcasting beacon 120 at a broadcasting power sufficient to transmit beacon 120 throughout an area 118. Because user 102 has initially placed extender 108 at a location within area 118, extender 108 receives beacon 120.

Extender 108, in response to receiving beacon 120, will transmit a probe request to extender 106 in order to initiate onboarding onto the wireless network. In many cases, the manufacturer of extender 108 may manufacture extenders for use throughout a plurality of countries or regions. Further, the country/region of deployment may not be known when an extender is shipped from the manufacturing plant.

When an extender is eventually powered up to initiate onboarding onto a detected wireless network as discussed above, the initial broadcasting power will be limited. In particular, there are Wi-Fi transmission power restrictions based on the region or country of deployment. For purposes of this discussion, consider the situation where extender 108 is manufactured by a manufacturer that supplies such extenders to multiple countries/regions. Accordingly, how much power at which extender 108 may broadcast the probe request as discussed above with reference to FIG. 1A is not a simple question. This will be described in greater detail with reference to FIG. 2.

Figure 2:
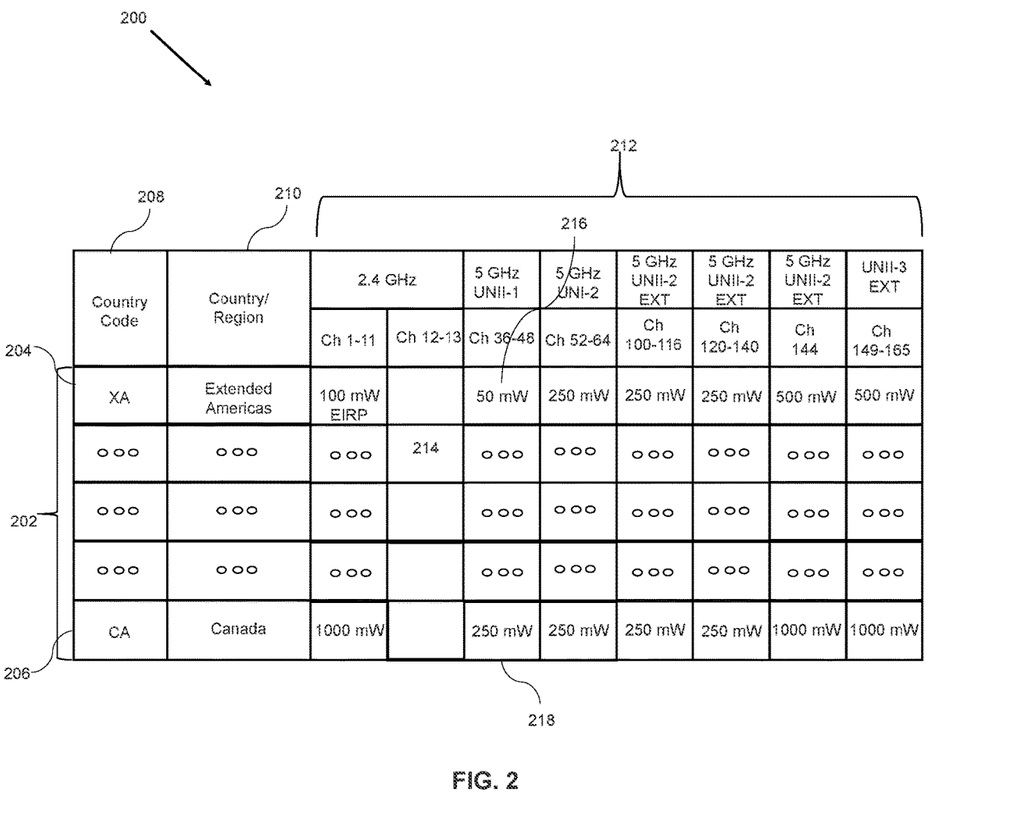
FIG. 2 illustrates a country code chart in accordance with aspects of the present disclosure.

FIG. 2 illustrates an example country code chart 200.

As shown in FIG. 2, country code chart 200 includes: a plurality rows 202, a sample of which includes a row 204 and a row 206; a country code column 208; a country/region column 210; a plurality of channel columns 212; a blackened area 214; and a plurality of entries, samples of which are indicated as entry 216 and entry 218.

Country code column 208 contains the country codes for countries for which extender 108 may be deployed. Each row in plurality of rows 202 corresponds to a specific country for which extender 108 may be deployed, two examples of which are labeled row 204 and row 206. In this example, row 204 includes a country code "XA," wherein the associated row 206 includes a country code "CA."

Country/region column 210 contains the countries for which extender 108 may be deployed. In this example, row 204 indicates that country code "XA" corresponds to the region Extended Americas, which may include all countries of North, South, and Central America. Further, in this example, row 206 indicates that country code "CA" corresponds specifically to Canada.

Plurality of channel columns 212 include columns for groups of available Wi-Fi channels, which include channels 1-11 and channels 12-13 in the 2.4 GHz band, and which also include channels 30-165 in the 5 GHz band as defined by the Unlicensed National Information Infrastructure (U-NII).

Country code chart 200 indicates the maximum allowable power at which a Wi-Fi extender as a backhaul station (bSTA) may initially broadcast a probe request to a network access point in order to onboard onto an existing wireless network. It should be noted that the data in country code chart 200 is merely repetitive any may not include true values for the indicated countries/regions. Further, it should be noted that some channels are unavailable in certain regions/countries, which is represented by blackened area 214 for channels 12-13 in the 2.4 GHz band.

Of more importance, country code chart 200 illustrates the difference in allowed maximum transmission powers between differing countries/regions. For example, for channels 36-48, if extender 108 were to try to onboard onto a wireless network, the maximum initial broadcast power to initiate onboarding, for example, when broadcasting a probe request, is only 50 mW if deployed in the Extended Americas as indicated by entry 216 of country code chart 200. This is because the Extended Americas regional power/channel information is reflective of a minimum common denominator for all countries in the region, and is needed by a device prior to learning of its specific country code. However, for channels 36-48, if extender 108 were to try to onboard onto a wireless network, the maximum initial broadcast power to initiate onboarding is 250 mW if deployed in Canada as indicated by entry 218 of country code chart 200.

Country code chart 200 is stored within a memory of extender 108. In order to determine the maximum allowable transmission power to use when initiating onboarding onto a new wireless network, extender 108 will reference country code chart 200 when it learns the country code of the wireless network. Unfortunately, extender 108 can only learn the country code, either from extender 108 or gateway device 104, after extender 108 has joined the wireless network. Alternatively, in some instances, extender 108 may learn the country code by contacting external server 110 via extender 108 and gateway device 104, after extender 108 has joined the wireless network. Therefore, the problem with the prior art method of onboarding an extender is that the extender cannot determine the actual maximum allowable transmission power to initiate onboarding.

As shown in country code chart 200, for channel 53, there may be multiple different maximum allowable transmission powers for initiating onboarding onto a new wireless network. For purposes of discussion, let residence 101 be located the extended Americas region and let extender 108 detect the beacon on channel 36. Further, for purposes of discussion, of all the countries/regions in country code chart 200, let Canada as shown in row 206 have the lowest maximum allowable transmission powers for initiating onboarding onto a new wireless network, at 250 mW. Here, because extender 108 does not know what country in which extender 108 is being deployed, it cannot determine the maximum allowable transmission powers for initiating onboarding onto a new wireless network. Therefore, to assure that extender 108 does not broadcast at a power that is higher than the maximum allowable transmission power for initiating onboarding onto a new wireless network in its current region, extender 108 will, by default, broadcast at the lowest maximum allowable transmission power for initiating onboarding onto a new wireless network for all countries/regions listed in country code chart 200. In this example therefore, extender 108 will, by default, broadcast 50 mW as indicated by the maximum allowable transmission power at allowed for its Extended Americas region, even though it may be located in Canada for which it is allowed to transmit at a higher power level.

Returning to FIG. 1A, circle 122 represents the area for which extender 108 can broadcast at 50 mW, whereas circle 124 represents the area for which extender 108 can broadcast at 250 mW. As discussed above, because extender 108 does not know the country/region in which it is operating at time $t_0$, is will by default broadcast at 50 mW. As shown in the figure, extender 108 therefore broadcasts a probe request 126, which only travels as far as circle 122. As a result, extender 106 does not receive probe request 126 and the onboarding of extender 108 is not initiated.

Think of the situation in this manner, extender 106 shouts at a large volume with its beacon 120, "HEY, HERE'S A WIRELESS NETWORK" (and the shout include some identifying information about the wireless network), and extender 108 whispers in response with probe request 126 at 50 mW "hey, can I join your network?" Unfortunately, in such a situation, probe request 126 from extender 108 will go unheard.

Eventually, user 102 will realize that the onboarding process is not working. To alleviate the problem, user 102 will have to pick up extender 108 and move it closer to extender 106. This will be described in greater detail with reference to FIG. 1B.

Figure 1B:
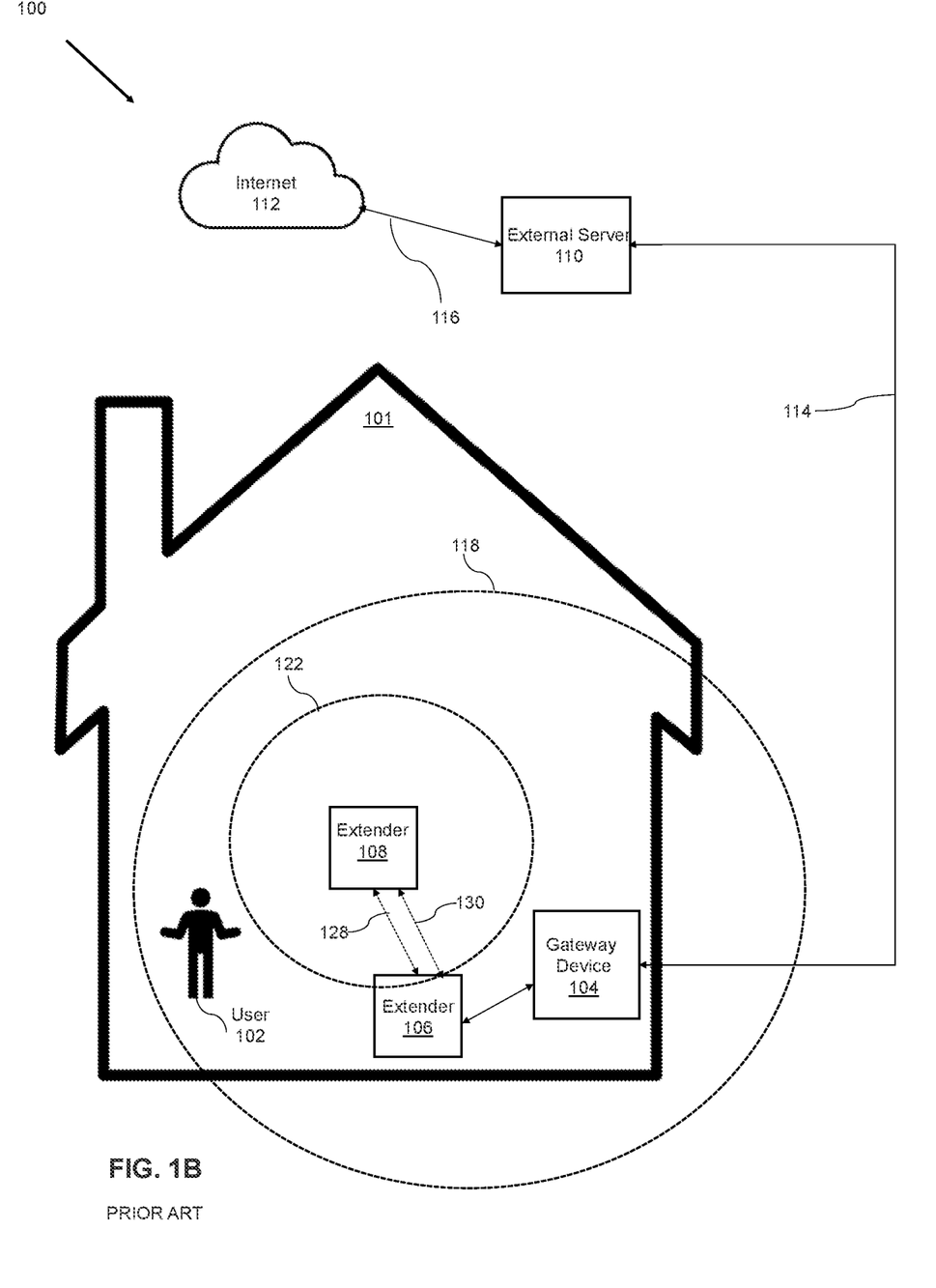
FIG. 1B illustrates the prior art communication system of FIG. 1A at a time $t_1$.

FIG. 1B illustrates prior art communication system 100 at a time $t_1$.

As shown in the figure, extender 108 is now located sufficiently close to extender 106 such that extender 106 is within broadcast area 122, when extender 108 is broadcasting at 50 mW. Now, in this case, when extender 106 broadcasts a new beacon 128, the new beacon is again received by extender 108. Extender 108 then transmits a new probe request 130, which is, this time, received by extender 106. At this point the onboarding process is initiated. Once onboarded, extender 108 may obtain the country code, either from one of extender 106 or gateway device 104, or from external server 110. In any event, with the country code known, extender 108 will be able to look up the appropriate maximum transmission power for initiating onboarding. At this point, if user 102 want to move extender 108 back to the original position, he may. This will be described in greater detail with reference to FIG. 1C.

Figure 1C:
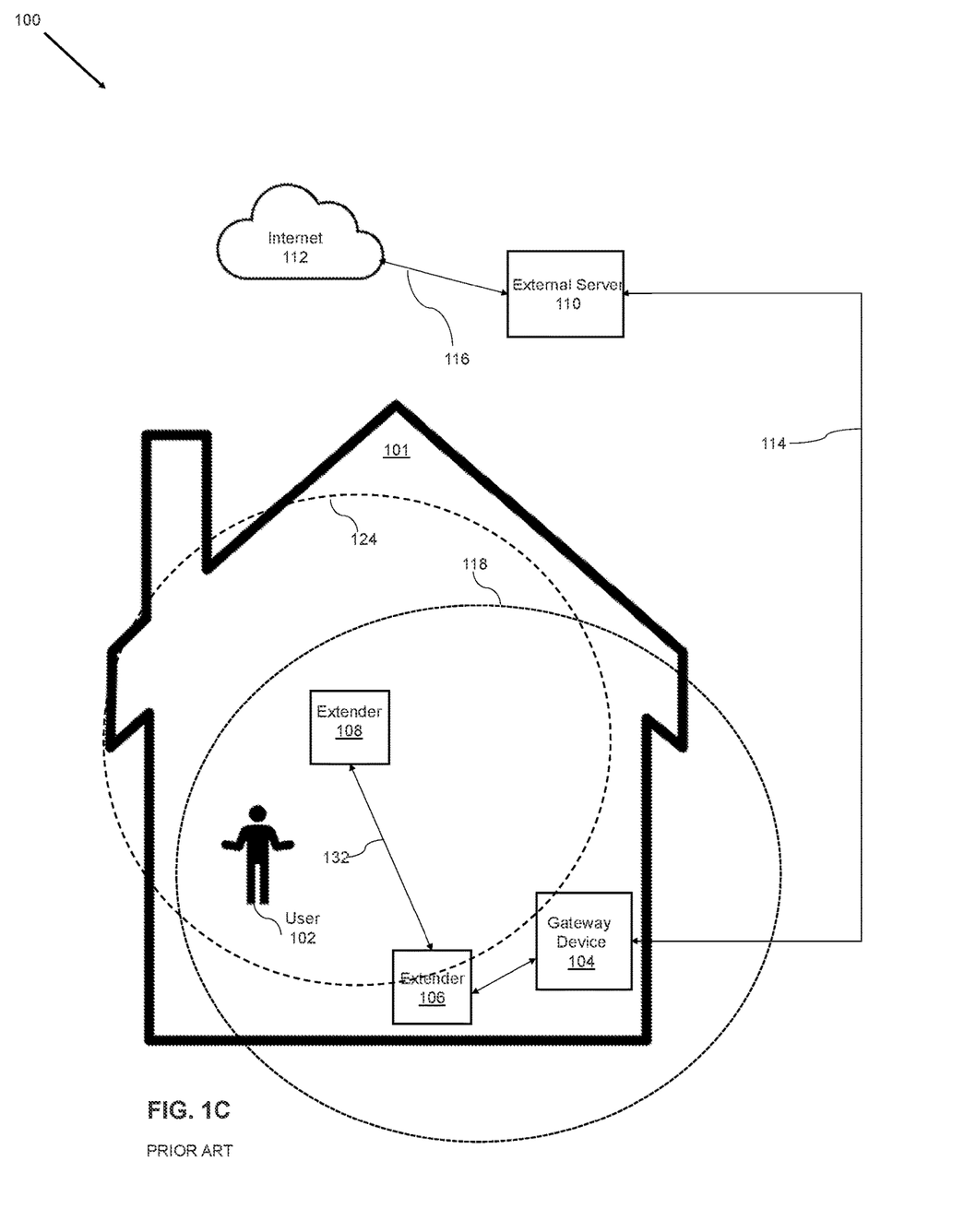
FIG. 1C illustrates the prior art communication system of FIG. 1A at a time $t_2$.

FIG. 1C illustrates prior art communication system 100 at a time $t_2$.

As shown in the figure, user 102 has move extender 108 back to the original position as discussed above with reference to FIG. 1A. When the user 102 unplugs extender 108 to move extender 108 back to the original position, extender 108 disassociates from the wireless network. When user 102 repowers extender 108 at the original position, extender 108 will need to connect to the network. However, in this instance, extender 108 now knows the country code for which it is operating. Therefore, extender 108 is able to transmit a probe request at 250 mW, which will be received by extender 106. Following a probe response from extender 106, extender 108 will be able to associate with extender 106 to establish a backhaul communication link with extender 108 to become connected to the wireless network as indicated by wireless communication channel 132.

As discussed above, many gateways and wireless extenders throughout many areas of the world are not provisioned with their country code. Instead, the devices learn of their country code after they have established an IP connection with the network. Prior to learning of their country code, the devices which use Wi-Fi radios as their network backhaul must only operate with restricted Wi-Fi power levels based on their region of deployment. The restricted power levels must be restricted to the least amount of power within the minimum common channel set allowed for any of the countries for its region of deployment.

Due to Wi-Fi power level restrictions based on region, user 102 should place extender 108 sufficiently close to extender 106 in order to extender 108 to transmit at the lowest transmission power limit in order to onboard onto the wireless network. If user 102 were to move extender 108 further away from extender 106, the onboarding process could not be initiated. Extender 108 cannot transmit at a power level that is higher than a universal minimum transmission power level of the available maximum power levels in order to be used in a plurality of regions or countries. In many cases, this universal minimum transmission power level of the available maximum power levels will likely be lower than an available maximum lower level.

This is not an issue for a gateway with direct WAN connection to the network. However, it is an issue for extenders which need to be connected (or onboarded) onto the wireless LAN (WLAN) to receive wireless backhaul credentials. Particularly for a user self-install of a wireless extender, a user wants to position their new extender at a recommended distance from an existing WLAN device (access point device) and have it successfully onboarded from there.

However, if the new wireless extender does not have its country code and must operate at restricted regional Wi-Fi power levels until getting its country code, the extender may not be successfully onboarded at the desired distance. Instead, a user may have to move their extender much closer to another WLAN device to have a successful onboarding, then move it back to the desired location afterwards. This can prove to be frustrating for the user. It may also result in care call to an operator if the on-boarding fails.

What is needed is a system and method for efficiently onboarding an extender to a network.

A system and method in accordance with the present disclosure efficiently onboards an extender to a network.

In accordance with the present disclosure, an extender will receive an onboarding communication from an access point. The onboarding communication will contain data that allows the onboarding extender to surpass the restricted onboarding broadcast power in order to connect with the wireless network. In one embodiment, the onboarding extender will receive the country code from the access point. The extender will then reference a country code look-up table, stored in its memory, to determine the maximum onboarding broadcast power. In another embodiment, the onboarding extender will receive the maximum broadcasting power without the country code. In another embodiment, the onboarding extender will receive an edited SSID which contains the country code in the name of the network. In all embodiments, the onboarding extender will determine the maximum available broadcasting power, and then connect to the network in an efficient manner.

An example system and method for onboarding an extender through maximizing the broadcasting power in accordance with aspects of the present disclosure will now be described in greater detail with reference to FIGS. 3-7.

Figure 3:
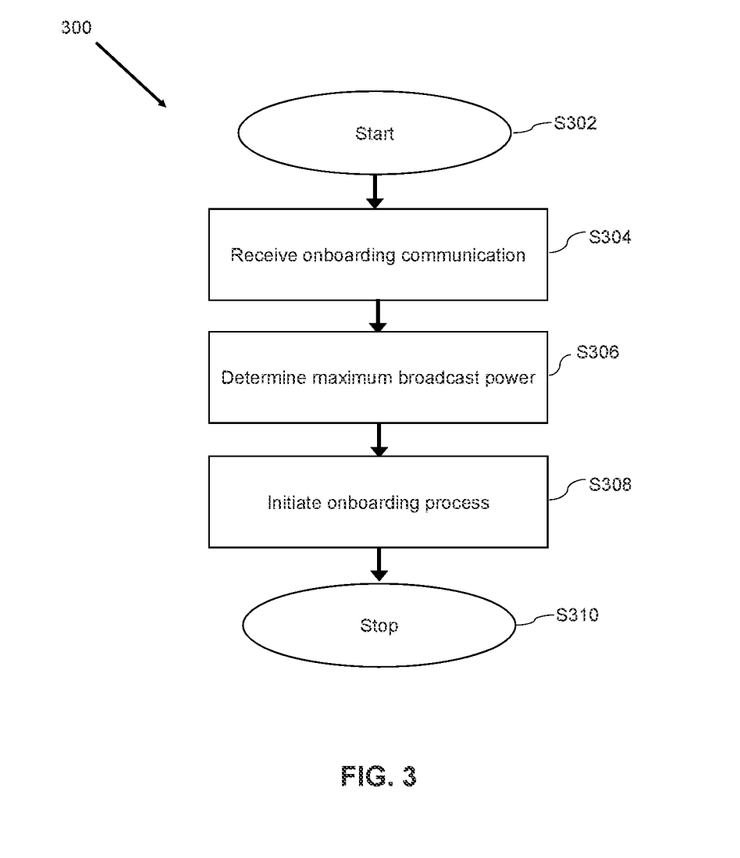
FIG. 3 illustrates an algorithm to be executed by a processor for onboarding an extender in accordance with aspects of the present disclosure.

FIG. 3 illustrates an algorithm 300 to be executed by a processor, located within an onboarding extender, for onboarding an extender in accordance with aspects of the present disclosure.

As shown in FIG. 3, algorithm 300 starts (S302), and the onboarding communication is received (S304). This will be described in greater detail with reference to FIGS. 3 and 4.

Figure 4:
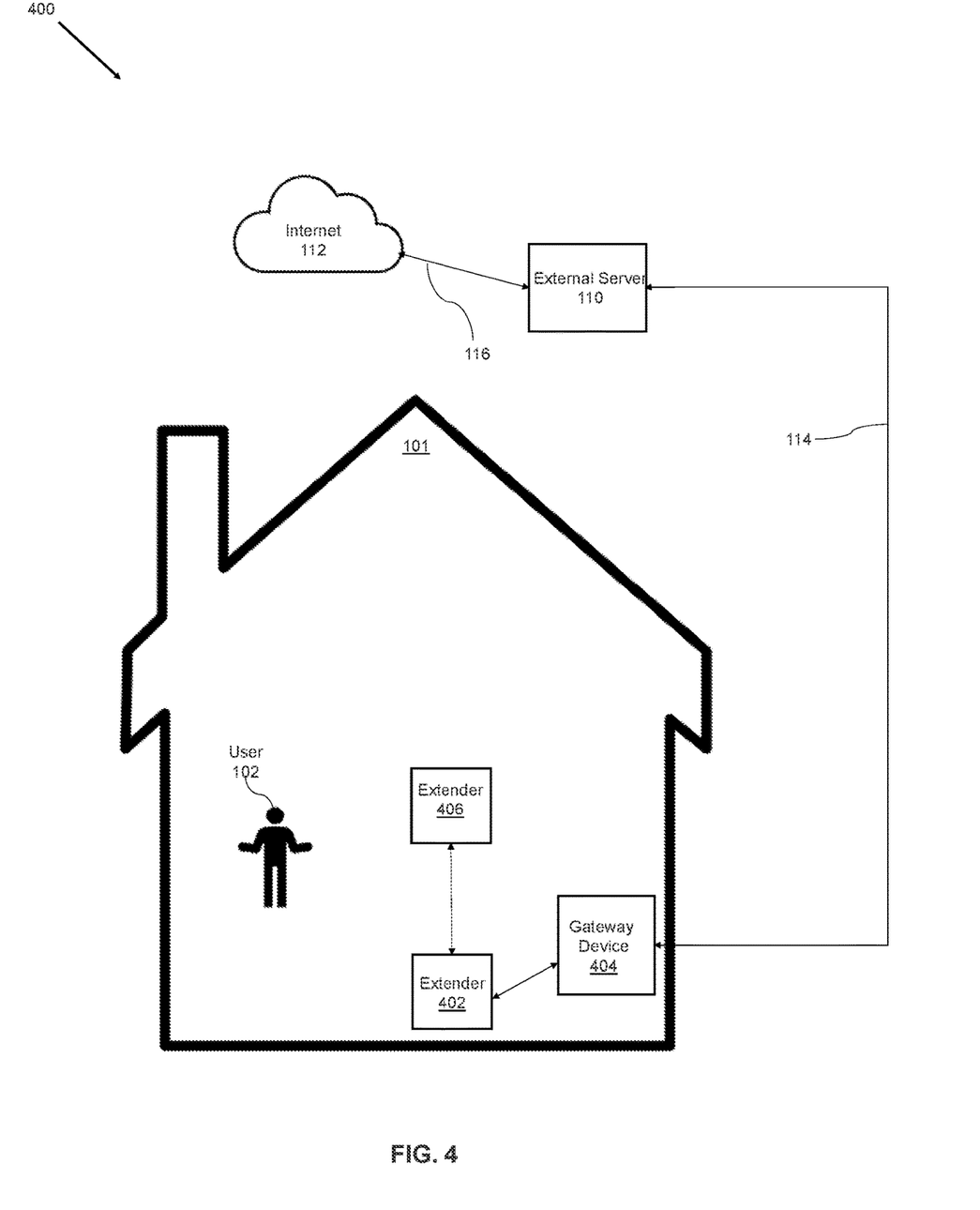
FIG. 4 illustrates a communication system in accordance with aspects of the present disclosure.

FIG. 4 illustrates a communication system 400 in accordance with aspects of the present disclosure.

As shown in FIG. 4, communication system 400 includes residence 101, user 102, a gateway device 404, an extender 402, an extender 406, external server 110, Internet 112, and communication channels 114 and 116.

Gateway device 404 is an electronic device that has a WAN connection and supports a LAN at a consumer premises. Gateway device 404 is a device that combines the functions of a modem and a router. A modem is a device that connects to your cable or phone lines and translates the data or information from the Internet to your computer or connected device. A router is a device that works with your modem to create and manage a wireless network so as to wirelessly take the data coming through the modem and send it wirelessly to multiple devices like smart phones, tablets, gaming consoles, and computers. The consumer premises can include a residential dwelling, an office, or any other business space of a user, such as residence 101. The terms home, office, and premises may be used synonymously herein.

Gateway device 404 may perform such functions as Web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED) egress queuing, TCP/UDP flow control), bandwidth usage policing, dynamic load balancing, and routing.

Further, it should be noted that gateway device 404 is able to communicate with external server 110 via communication channel 114, which may optionally be a wireless communication system, such as 4G, or 5G, and further is able to connect to Internet 112 via communication channel 116.

Gateway device 404 serves as a gateway or an access point to Internet 112 for one or more electronic devices.

In residence 101, gateway device 404, extender 402, and extender 406 are access points.

Returning to FIG. 3, presume that user 102 has recently purchased extender 406 and would like to onboard extender 406 onto the network of residence 101. User 102 will then begin to create a backhaul connection between extender 406 and extender 402, which is connected to Internet 112 via gateway device 404 and external server 110. Extender 406 will receive an onboarding communication from extender 402. This will be described in greater detail with reference to FIG. 5.

Figure 5:
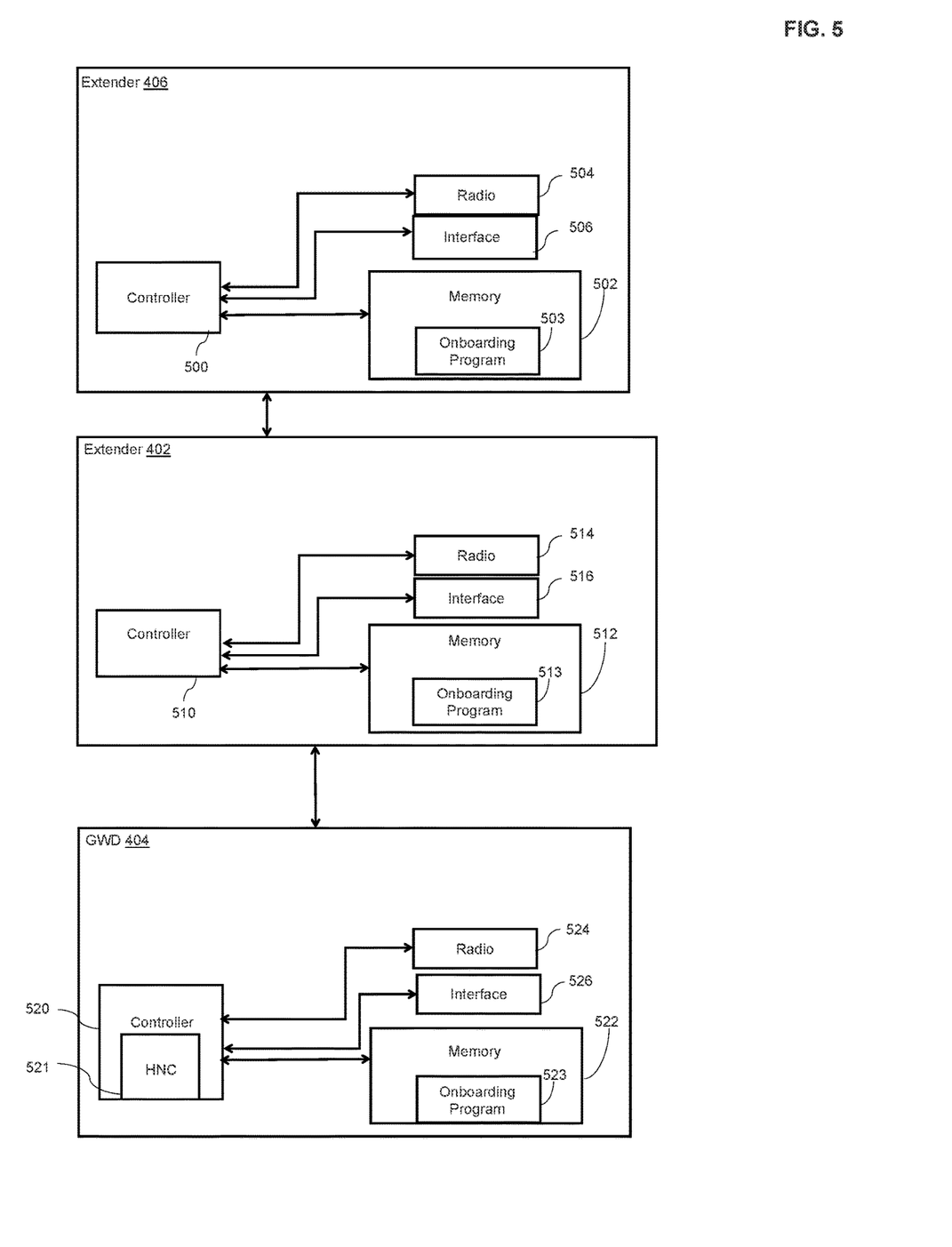
FIG. 5 illustrates an exploded view of a primary extender, a secondary extender, and a gateway device in accordance with aspects of the present disclosure.

FIG. 5 illustrates an exploded view of extender 406, extender 402, and gateway device 404 in accordance with aspects of the present disclosure.

As shown in FIG. 5, extender 406 includes: a controller 500; a memory 502, which has stored therein an onboarding program 503; at least one radio, a sample of which is illustrated as a radio 504; and an interface 506. Onboarding program 503 include a country code chart, similar to that discussed above with reference to FIG. 2.

In this example, controller 500, memory 502, radio 504, and interface 506 are illustrated as individual devices. However, in some embodiments, at least two of controller 500, memory 502, radio 504, and interface 506 may be combined as a unitary device. Further, in some embodiments, at least one of controller 500 and memory 502 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 500 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of any client devices in the network in accordance with the embodiments described in the present disclosure.

Memory 502, as will be described in greater detail below, has instructions, including onboarding program 503, stored therein to be executed by controller 500 to: receive the onboarding communication on the current operating channel; identify the determined maximum broadcasting power based on the onboarding communication and the country code data; and initiate the onboarding process with extender 402 at the determined maximum broadcasting power on the current operating channel.

In some embodiments, memory 502, as will be described in greater detail below, has instructions, including onboarding program 503, stored therein to be executed by controller 500 to: retrieve the country code from the beacon; and identify the determined maximum broadcasting power on the current operating channel based on the country code, the country code data, and the maximum broadcasting power data.

In some embodiments, memory 502, as will be described in greater detail below, has instructions, including onboarding program 503, stored therein to be executed by controller 500 to: retrieve the maximum transmission power value from the beacon; and identify the determined maximum broadcasting power based on the maximum transmission power value.

In some embodiments, memory 502, as will be described in greater detail below, has instructions, including onboarding program 503, stored therein to be executed by controller 500 to: retrieve the country code from the SSID name that contains the country code information; and identify the determined maximum broadcasting power based on the country code information, the country code data, and the maximum broadcasting power data.

Radio 504 may include a Wi-Fi WLAN interface radio transceiver that is operable to communicate with extender 402 and gateway device 404. Radio 504 includes one or more antennas and communicates wirelessly via one or more of the 2.4 GHz band, the 5 GHz band, the 6 GHz band, and the 60 GHz band, or at the appropriate band and bandwidth to implement any IEEE 202.11 Wi-Fi protocols, such as the Wi-Fi 4, 5, 6, or 6E protocols. Extender 406 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 202.15.4 protocol.

Interface 506 can include one or more connectors, such as RF connectors, or Ethernet connectors, and/or wireless communication circuitry, such as 5G circuitry and one or more antennas.

As shown in FIG. 5, extender 402 includes: a controller 510; a memory 512, which has stored therein an onboarding program 513; at least one radio, a sample of which is illustrated as a radio 514; and an interface 516. Onboarding program 513 includes the country code for which extender 402 is operating such that extender 402 may pass such information on to any other extenders that wish to onboard.

In this example, controller 510, memory 512, radio 514, and interface 516 are illustrated as individual devices. However, in some embodiments, at least two of controller 510, memory 512, radio 514, and interface 516 may be combined as a unitary device. Further, in some embodiments, at least one of controller 510 and memory 512 may be implemented as a computer having tangible computer-readable media for carrying or having computer-executable instructions or data structures stored thereon.

Controller 510 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of extender 402 in accordance with the embodiments described in the present disclosure.

Memory 512, as will be described in greater detail below, has instructions, including onboarding program 513, stored therein to be executed by controller 510 to provide the onboarding communication to extender 406.

Radio 514 may include a Wi-Fi WLAN interface radio transceiver that is operable to communicate with extender 406 and gateway device 404. Radio 514 includes one or more antennas and communicate wirelessly via one or more of the 2.4 GHz band, the 5 GHz band, the 6 GHz band, and the 6E GHz band, or at the appropriate band and bandwidth to implement any IEEE 202.11 Wi-Fi protocols, such as the Wi-Fi 4, 5, 6, or 6E protocols. Radio 514 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 202.15.4 protocol.

As shown in FIG. 5, gateway device 404 includes: a controller 520, which has stored therein a home network controller (HNC) 521; a memory 522, which has stored thereon an onboarding program 523; and at least one radio, a sample of which is illustrated as a radio 524; and an interface 526. Onboarding program 523 includes the country code for which gateway device 404 is operating such that gateway device 404 may pass such information on to any other extenders that wish to onboard.

In this example, controller 520, memory 522, radio 524, and interface 526 are illustrated as individual devices. However, in some embodiments, at least two of controller 520, memory 522, radio 524, and interface 526 may be combined as a unitary device. Further, in some embodiments, at least one of controller 520 and memory 522 may be implemented as a computer having tangible computer-readable media for carrying or having computer-executable instructions or data structures stored thereon.

Controller 520 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 404 in accordance with the embodiments described in the present disclosure.

HNC 521 controls extender 402 within the wireless network. HNC 521 may perform tasks such as steering connected devices, a non-limiting example of which is a cell phone, from one access point to another.

Memory 522 may be any device or system capable of storing data and instructions, including onboarding program 523.

Radio 524 may include a Wi-Fi WLAN interface radio transceiver that is operable to communicate with extender 402 and external server 110. Radio 524 includes one or more antennas and communicates wirelessly via one or more of the 2.4 GHz band, the 5 GHz band, the 6 GHz band, and the 6E GHz band, or at the appropriate band and bandwidth to implement any IEEE 202.11 Wi-Fi protocols, such as the Wi-Fi 4, 5, 6, or 6E protocols. Radio 524 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 202.15.4 protocol.

Interface 526 can include one or more connectors, such as RF connectors, or Ethernet connectors, and/or wireless communication circuitry, such as 5G circuitry and one or more antennas. Interface 526 receives data from external server 110 by known methods, non-limiting examples of which include terrestrial antenna, satellite dish, wired cable, DSL, optical fibers, or 5G as discussed above.

Returning to FIG. 3, presume that user 102 has decided to onboard the newly purchased extender 406 to their home network. Controller 510 of extender 402 will execute instructions stored on memory 512 to allow extender 402 to transmit an onboarding communication, via radio 514, to radio 504 of extender 406. Controller 500 of extender 406 will execute instructions stored on memory 502 to allow extender 406 to: receive the onboarding communication from radio 514 of extender 402; and analyze the onboarding communication to determine the maximum broadcasting power.

In some embodiments, the onboarding communication will contain the country code, in which extender 406 will compare the country code to an internally stored country code look up table and determine the maximum broadcasting power. In some embodiments, the onboarding communication will contain the maximum broadcasting power directly, where extender 406 will determine the maximum broadcasting power without the use of a country code. In some embodiments, the onboarding communication will contain an edited SSID which includes the country code in the name, in which extender 406 will compare the country code to the internally stored country code look up table.

Returning to FIG. 3, after the onboarding communication is received (S304), the maximum broadcasting power is determined (S306). This will be described in greater detail with reference to FIGS. 6-7.

Figure 6:
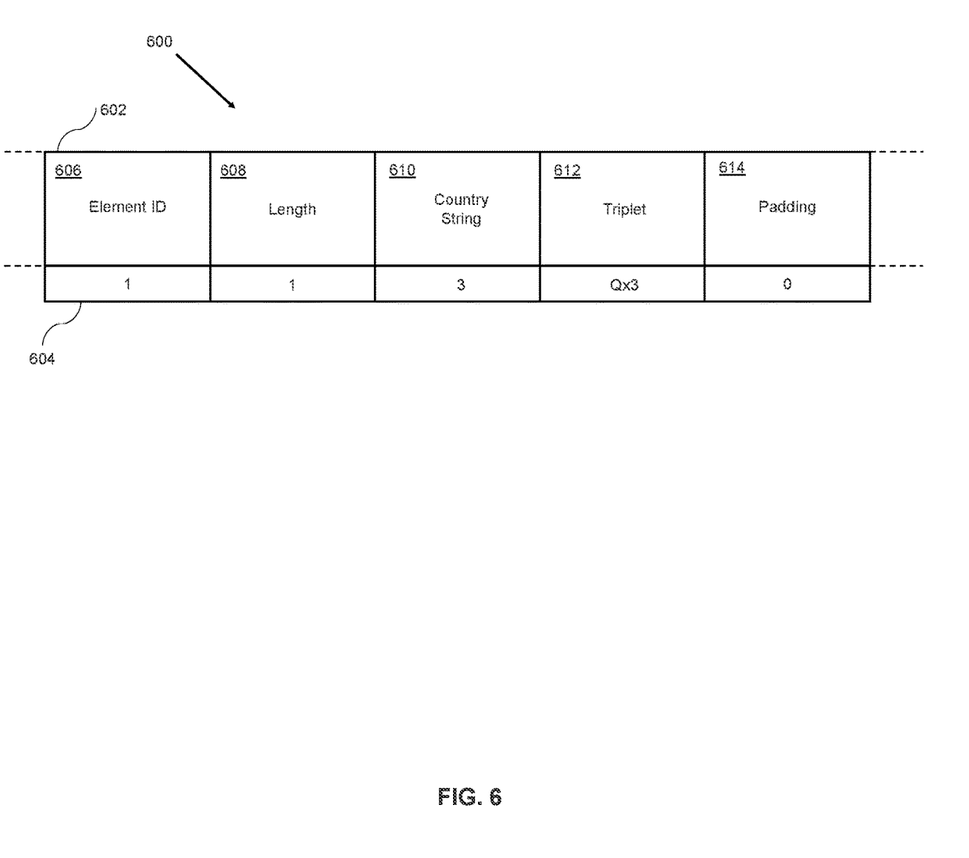
FIG. 6 illustrates a sample beacon structure in accordance with aspects of the present disclosure.

FIG. 6 illustrates a beacon 600 in accordance with aspects of the present disclosure.

As shown in the figure, beacon 600 includes a country element 602, which includes a plurality of fields, each having a length shown by octet row 604. The fields in country element 602 include an element ID field 606; a length field 608; a country string field 610; a triplet field 612; and a padding field 614.

Octet row 604 contains the octet values of element ID field 606, length field 608, country string field 610, triplet field 612, and padding field 614. IN this example embodiment, element ID field 606 is one octet (8 bits), length field 608 is one octet, country string field 610 is three octets (24 bits), triplet field 612 is (Qx3), and padding field 614 is octets. Element ID field 606 identifies beacon 600 as the country code onboarding communication. Length field 608 identifies the bit size of country element 602 within beacon 600. Country string field 610 identifies which country or region in which extender 402 is currently operating.

Country string field 610 is a three-character ASCII string of where the station is operating. The first two letters are the ISO country code (e.g., "US" for the United States). Many countries have different indoor and outdoor regulations, and the third character distinguishes between the two. When a single set of omnibus regulations covers all environments, the third character is a space. To designate indoor or outdoor regulations only, the third character may be set to "I" or "O", respectively.

Triplet field 612 includes a First Channel Number (1 byte), a Number of Channels (1 byte) and a Maximum Transmit Power (1 byte). The First Channel Number is the lowest channel subject to the power constraint. The Number of Channels is the size of the band subject to the power constraint is indicated by the number of channels. The size of a channel is PHY-dependent. The Maximum Transmit Power is the maximum transmit power, expressed in dBm.

In some embodiments, extender 406 will receive the country code prior to onboarding the network. For example, presume that extender 402 has transmitted the onboarding communication to extender 406 in the form of beacon 600. Controller 500 of extender 406 will execute instructions stored on memory 502 to cause extender 406 to analyze beacon 600. Presume that extender 406 then determines that, through the analysis of country string field, that extender 402 is operating in extended Americas. Controller 500 will execute instructions stored on memory 502 to cause extender 406 to compare the country code data of beacon 600 to the country code chart 200, stored within memory 502 of extender 406. For example, if extender 402 is operating on the 5 GHz channel 36, extender 406 will determine that the maximum allowable transmission power in Canada, located in country code row 206, is 250 mW. Extender 406 will then be able to initiate the onboarding process with an initial transmission power 250 mW. This will significantly increase the range at which extender 406 is able onboard onto the wireless network. Extender 406 will then onboard onto the wireless network. This will prevent user 102 from moving extender 406 closer to extender 402 because of a failed attempt to onboard as discussed above in the prior art situation with reference to FIGS. 1A-1C.

Another onboarding communication embodiment will be discussed with reference to FIG. 7.

Figure 7:
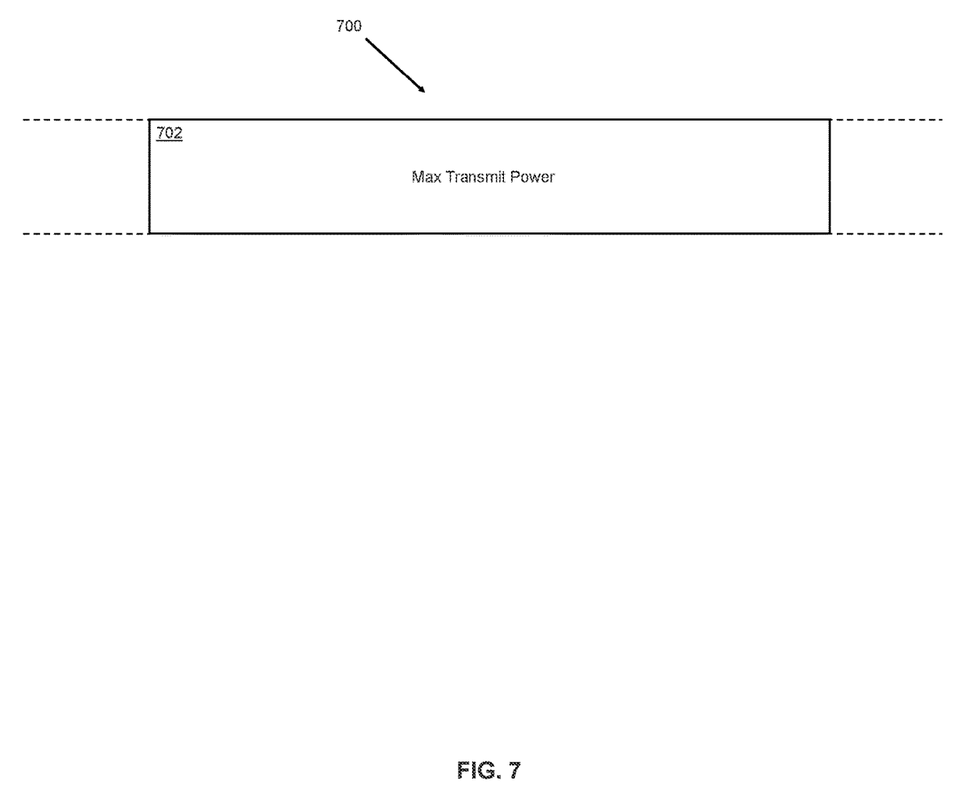
FIG. 7 illustrates a sample beacon in accordance with aspects of the present disclosure.

FIG. 7 illustrates a beacon 700 in accordance with aspects of the present disclosure.

As shown in FIG. 7, beacon 700 includes a max transmission power field 702. Max transmission power field 702 will inform extender 406 of the maximum broadcasting power.

In some embodiments, extender 406 will only receive the maximum broadcasting power. In this example embodiment, extender 406 does not need to know the country code. On the contrary, extender 406 merely receives that actual maximum allowable transmission power directly from extender 402 in the beacon.

For example, presume that extender 402 has transmitted the onboarding communication to extender 406 in the form of beacon 700. Controller 500 of extender 406 will execute instructions stored on memory 502 to cause extender 406 to analyze beacon 700. Further, presume that max transmission power field 702 is determined to be 250 mW. Extender 406 will then initiate the onboarding process by broadcasting a probe request at 250 mW. Again, extender 406 will then be able to initiate the onboarding process with an initial transmission power 250 mW. This will significantly increase the range at which extender 406 is able onboard onto the wireless network. Extender 406 will then onboard onto the wireless network. This embodiment will additionally prevent user 102 from moving extender 406 closer to extender 402 because of a failed attempt to onboard as discussed above in the prior art situation with reference to FIGS. 1A-1C.

While extender 406 requires the country code in the first embodiment, the goal is to increase the broadcasting power. With the country code, extender 406 can reference country code chart 200 and thereby determine the maximum broadcasting power of the region associated with the country code. However, extender 402 may transmit the maximum broadcasting power directly. Extender 406 will not have the country code of the network until after it onboards, but it still is able to onboard more effectively by increasing the broadcasting power to the power level transmitted by extender 402.

In yet other embodiments, the SSID of the network as broadcast in the beacon will include the country code. In such an embodiment, extender 406 will know the of the SSID prior to the onboarding process. For example, presume that extender 406 is attempting to connect to the network. Controller 510 of extender 402 will execute instructions stored on memory 512 to cause extender 402 to generate the SSID name of the network to include the country code. Extender 402 will then transmit the onboarding communication to extender 406 in the form of a beacon which contains the SSID including the country code. Controller 500 of extender 406 will execute instructions stored on memory 502 to cause extender 406 to analyze the SSID name. Extender 406 will analyze the SSID name, a non-limiting example of which being Network1@CA, and determine that the SSID now includes the country code appended after the "@" symbol. In this example therefore, the country code for which extender 402 is operating is CA, which corresponds to Canada. Extender 406 will refer to country code chart 200 and begin transmitting at the maximum broadcasting power associated with the respective channel of extender 402.

Returning to FIG. 3, after the maximum broadcasting power is determined (S306), the onboarding process is initiated (S308). For example, extender 406 will analyze the onboarding communication transmitted from extender 402. In all embodiments, extender 406 will determine the maximum broadcasting power of the channel on which extender 402 is currently operating. The onboarding process will then begin much more efficiently.

Returning to FIG. 3, after the onboarding process is initiated (S308), algorithm 300 stops (S310).

In some embodiments, the onboarding extender may connect directly to the gateway, opposed to connecting to an extender. The ongoing example throughout this document has the onboarding extender connect to an already connected extender. The onboarding extender may also connect to the gateway. For example, if extender 402 was not present within residence 101, gateway device 404 would transmit the onboarding communication to extender 406 directly. Controller 520 would execute instructions stored on memory 522 causing gateway device 404 to transmit, via radio 524, the onboarding communication to radio 504 of extender 406. Extender 406 would then connect to the network using one of the sample embodiments described above.

Many gateways and wireless extenders throughout many areas of the world are not provisioned with their country code. Instead, the devices learn of their country code after they have connected to the network. Prior to learning of their country code, the devices which use Wi-Fi radios as their network backhaul must only operate with restricted Wi-Fi power levels based on their region of deployment. The restricted power levels must be restricted to the least amount of power within the minimum common channel set allowed for any of the countries for its region of deployment. Due to the restricted power, the extender may not be successful in its onboarding at the desired distance. Instead, a user may have to move their extender much closer to another WLAN device to have a successful onboarding, then move it back to the desired location afterwards. This can prove to be frustrating for the user.

In accordance with the present disclosure, an extender attempting to connect to a network will receive an onboarding communication with a currently connected access point device. In some embodiments, the onboarding communication will contain the country code of the connected access point device. The onboarding extender will compare the country code to a country code look-up table and find the corresponding maximum broadcasting power. In some embodiments, the connected access point device will give the onboarding extender the maximum broadcasting power directly. In some embodiments, the connected access point device will give the onboarding extender an edited SSID which contains therein the country code. In all embodiments, the onboarding extender will determine the maximum broadcasting power, and begin onboarding at that power level.

Thus, the present disclosure as disclosed discloses the maximum broadcasting power to an onboarding extender, thereby increasing the range of the extender and decreasing the time it takes to onboard.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A wireless network extender device for use with a wireless access point device which is connected to a wireless network, and configured to transmit, in an onboarding communication comprising a beacon on a current operating channel, an SSID name that contains ISO country code information used for onboarding, the beacon comprising the SSID name that contains the ISO country code information, the wireless network extender device comprising:
   a radio configured to receive the onboarding communication on the current operating channel and initiate an onboarding process with the wireless access point device at one of a default maximum broadcasting power on the current operating channel or a determined maximum broadcasting power on the current operating channel;
   a memory having instructions and country code data stored therein, the country code data including maximum broadcasting power data of the current operating channel; and
   a processor configured to execute the instructions stored on the memory to cause the wireless network extender device to:
      receive the onboarding communication on the current operating channel;
      retrieve an ISO country code from the SSID name that contains the ISO country code information;
      identify the determined maximum broadcasting power based on the onboarding communication, the ISO country code, the country code data, and the maximum broadcasting power data; and
      initiate the onboarding process with the wireless access point device at the determined maximum broadcasting power on the current operating channel.

2. A method of operating a wireless network extender device with a wireless access point device which is connected to a wireless network, and configured to transmit, in an onboarding communication comprising a beacon on a current operating channel, an SSID name that contains ISO country code information used for onboarding, the beacon comprising the SSID name that contains the ISO country code information, the method comprising:
   receiving, via a radio configured to receive the onboarding communication and initiate an onboarding process with the wireless access point device at one of a default maximum broadcasting power on the current operating channel and a determined maximum broadcasting power on the current operating channel, the onboarding communication on the current operating channel;
   retrieving, via a processor configured to execute instructions stored on a memory having country code data stored therein, an ISO country code from the SSID name that contains the ISO country code information, wherein the country code data includes maximum broadcasting power data of the current operating channel;
   identifying, via the processor, a determined maximum broadcasting power based on the onboarding communication, the ISO country code, the country code data, and the maximum broadcasting power data; and
   instructing, via the processor, the radio to initiate the onboarding process with the wireless access point device at the determined maximum broadcasting power on the current operating channel.

3. A non-transitory, computer-readable medium having computer-readable instructions stored thereon, the computer-readable instructions being capable of being read by a wireless network extender device for use with a wireless access point device which is connected to a wireless network, and configured to transmit, in an onboarding communication comprising a beacon on a current operating channel, an SSID name that contains ISO country code information used for onboarding, the beacon comprising the SSID name that contains the ISO country code information, the computer-readable instructions being capable of instructing the wireless network extender device to perform a method comprising:
   receiving, via a radio configured to receive the onboarding communication and initiate an onboarding process with the wireless access point device at one of a default maximum broadcasting power on the current operating channel and a determined maximum broadcasting power on the current operating channel, the onboarding communication on the current operating channel;
   retrieving, via a processor configured to execute the computer-readable instructions that are stored on a memory having country code data stored therein, an ISO country code from the SSID name that contains the ISO country code information, wherein the country code data includes maximum broadcasting power data of the current operating channel;
   identifying, via the processor, a determined maximum broadcasting power based on the onboarding communication, the ISO country code, the country code data, and the maximum broadcasting power data; and
   instructing, via the processor, the radio to initiate the onboarding process with the wireless access point device at the determined maximum broadcasting power on the current operating channel.

* * * * *